United States Patent
Hars et al.

(10) Patent No.: US 6,763,366 B2
(45) Date of Patent: Jul. 13, 2004

(54) METHOD FOR CALCULATING ARITHMETIC INVERSE OVER FINITE FIELDS FOR USE IN CRYPTOGRAPHY

(75) Inventors: Laszlo Hars, Cortlandt Manor, NY (US); Gregory Michael Perkins, Pennington, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 403 days.

(21) Appl. No.: 09/859,244

(22) Filed: May 17, 2001

(65) Prior Publication Data

US 2002/0174155 A1 Nov. 21, 2002

(51) Int. Cl.$^7$ ................................................. G06F 7/38
(52) U.S. Cl. ..................................................... 708/491
(58) Field of Search ................................. 708/491–492; 380/30

(56) References Cited

U.S. PATENT DOCUMENTS

5,497,423 A 3/1996 Miyaji

*Primary Examiner*—Tan V. Mai
(74) *Attorney, Agent, or Firm*—RatnerPrestia (57) ABSTRACT

A method for calculating greatest common divisors and modular inverses using the extended Jebelean GCD algorithm keeps track of the number of times that U3 and V3 have been divided by two in the process of calculating the greatest common divisor and correct the modular inverse for these divisions. The shifting of the binary values representing U3 that occurs during the calculation of the GCD is accomplished by changing the position of respective pointers to bit positions in the binary values rather than implementing a shifting operation.

15 Claims, 8 Drawing Sheets

MAKEODD1 (X)

METHOD FOR CALCULATING ARITHMETIC INVERSE OVER FINITE FIELDS FOR USE IN CRYPTOGRAPHY

BACKGROUND OF THE INVENTION

The present invention is directed to extended greatest common divisor algorithms and in particular to an improved Jebelean greatest common divisor algorithm that efficiently calculates arithmetic inverses. (The extended greatest common divisor algorithm calculates 3 integers from two positive integers as follows: $[\alpha,\beta,d]=GCD(u,v)$ such that $d|u$, $d|v$, $\forall e>d$: $\neg(e|u \ \& \ e|v)$ and $\alpha \cdot u + \beta \cdot v = d$.)

Modular arithmetic is used in many applications such as encryption algorithms and the generation of error correcting codes. When the modulus is a prime number (p), the operations of addition, subtraction, multiplication and division with nonzero elements as well as the associative, commutative and distributive properties are defined over the set of numbers from zero to p. This set of numbers defines a Finite field modulo p, $F_P$. They are often referred as "Prime Fields".

Extended GCD algorithms are commonly used to find inverses in large Finite fields, which are of interest for encryption purposes. One type of encryption algorithm encrypts data using exponentiation over a large finite field, relying on the inherent difficulty of the inverse of exponentiation, the discrete logarithm problem, to hold the data secure. Encryption performed on a large finite field (having more elements) is more secure than encryption performed on a small field. One problem with using large finite fields, however, is the difficulty in performing even simple arithmetic operations on the large numbers in the field. Typical numbers used in data encryption have hundreds of bits. These numbers are too large to be easily handled by commonly available microprocessors that are limited to 32 or 64-bit arithmetic. This is especially true of exponentiation where a 100-bit number is raised to the power of second 100-bit number and the result is determined modulo a third 100-bit number. As described below, calculations using these large numbers are typically handled using multiprecision arithmetic.

Another type of encryption algorithm uses multiplication by an integer number within an elliptic curve group, where the group operation is symbolized by addition. (It is the same as exponentiation in groups, where the group operation is denoted by multiplication.) An elliptic curve group is defined on ordered pairs of points of a grid that lie on an elliptic curve defined by an equation such as equation (1).

$$Y^2=(X^3+A\cdot X+B) \bmod P \quad (1)$$

where P is a prime number equal to the number of rows and the number of columns in the grid together with a special point $\circ$, called the point at infinity. In elliptic curve cryptography, an encryption key is generated by multiplying a generator point P by itself k times. (i.e. Q=kP, where Q is the encryption key).

Multiplication by an integer in the elliptic curve group is modeled as repeated addition of the group elements to themselves. Addition of a group element to itself in an elliptic curve group, however, is not as simple as integer addition. Because points in the elliptic curve group are ordered pairs, addition may be represented as, $(X_1,Y_1)+(X_2,Y_2)=(X_3,Y_3)$ where $X_3, Y_3$ are defined by equations (2) and (3) if neither of the points is the point at infinity (in which case the definition states that $(X_1,Y_1)+\circ=(X_1,Y_1)$). L a variable used in equations (2) and (3) is defined by equation (4).

$$X_3=L^2-X_1-X_2 \bmod P \quad (2)$$

$$Y_3=L(X_1-X_3)-Y_1 \bmod P \quad (3)$$

$$L=(Y_2-Y_1)/(X_2-X_1) \bmod P \quad (4)$$

If $X_1=X_2$ and $Y_1=Y_2$, $X_3$ and $Y_3$ are defined by equations (5) and (6).

$$X_3=L^2-2X_1 \bmod P \quad (5)$$

$$Y_3=L(X_1-X_3)-Y_1 \bmod P \quad (6)$$

$$L=(3X_1^2+A)/2Y_1 \quad (7)$$

Where A is the coefficient of X in equation (1).

Thus, addition of two members of the elliptic curve group involves a modular integer division operation. In modular arithmetic, division of a value N by a value D means multiplication of N by the arithmetic inverse of D, $D^{-1}$. It is known that an arithmetic inverse of a number in a finite field may be calculated using the extended greatest common divisor algorithm.

Figure 1:
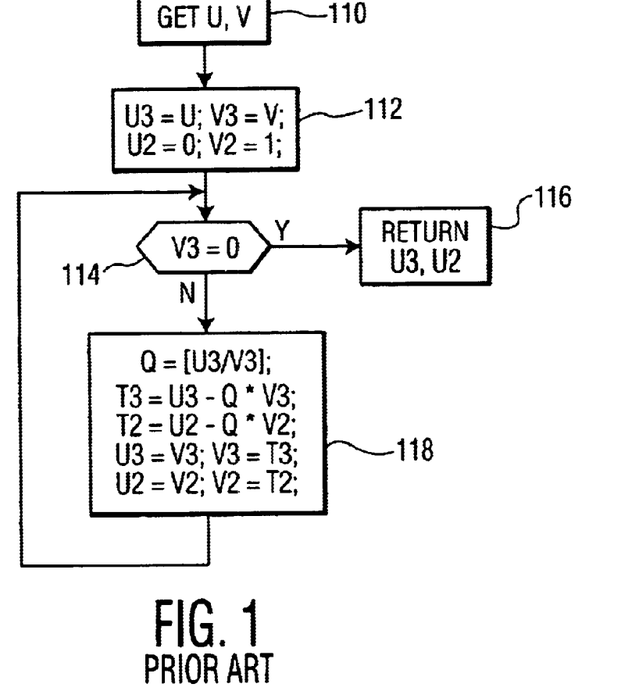
FIG. 1 (Prior Art) is a flow chart diagram of the extended Euclidean GCD algorithm.

FIG. 1 is a flow chart diagram, which illustrates an extended greatest common divisor (GCD) algorithm known as Euclid's or Euclidean algorithm. The algorithm shown in FIG. 1 calculates the greatest common divisor of U and V where U is greater than V. This algorithm relies on the property that if U and V have a common divisor D so does U−V, U−2V and so on. Thus, using only subtraction, one can calculate the GCD of U and V. GCD algorithms run faster when they can combine multiple subtractions in a single step. In general, GCD algorithms operate by successively reducing the values of U and V, combining multiple subtraction operations where possible, while maintaining the equations (7), (8) and (9)

$$U1 \cdot U + U2 \cdot V = U3 \quad (7)$$

$$V1 \cdot U + V2 \cdot V = V3 \quad (8)$$

$$T1 \cdot U + T2 \cdot V = T3 \quad (9)$$

Where $U \geq V$ and (U1, U2, U3) and (V1, V2, V3) are initially assigned the values of (1, 0, U) and (0, 1, V), respectively. If the algorithm is used to calculate the greatest common divisor of a prime number P and a value X, then, upon termination, U3=GCD(P, X)=1 and U2=$X_{-1}$ MOD P. In general terms, GCD algorithms operate by repetitively reducing the number of bits in the larger value, U, and switching the two values. Thus, the algorithm successively reduces the values of U3 and V3 while maintaining the equations. Because it also maintains the values U2 and V2, the algorithm shown in FIG. 1 not only calculates the greatest common divisor of U and V but also calculates the inverse of V modulo U (assuming U is a prime). That is to say, $V^{-1}$ where $V \cdot V^{-1}=1$ modulo U. Furthermore, it is noted that the variables U1, V1 and T1 do not need to be maintained because they can be determined from the other variables, for example, U1 can be determined from U2 and U3 by the identity U1=(U3−U2·V)/U. As described below, when U is a prime number, this inverse may be used for division operations performed on the Finite field $F_U$.

The algorithm shown in FIG. 1 begins at step 110 by obtaining the values U and V. Next, at step 112 a temporary variable U3 is set equal to U and a temporary variable V3 is set equal to V. Also in step 112 the variable U2 is set to zero and V2 is set one. Next, at step 114 the variable V3 is tested to determine if it is equal to zero. When V3 is equal to zero, U3 contains the GCD of U and V and U2 contains the arithmetic inverse of V modulo U (a prime). At step 116, the values U3 and U2 are returned.

If V3 does not equal zero at step 114, step 118 is executed. This step calculates a value Q which is equal to the greatest integer less than or equal to U3/V3. Next, it determines a new value for U3 by storing the quantity, U3−Q·V3 into a temporary variable T3. Also at step 118, the process stores the value U2−Q·V2 into a temporary variable T2. This value is the new value for the variable U2. The variable T3 holds the new value of U3. Because U3 has been reduced but V3 has not, U3 is less than V3. Consequently, the values of U3 and V3 are switched and the values U2 and V2 are also switched by the instructions that set U3=V3, V3=T3, U2=V2 and V2=T2. After step 118, control returns to step 114 where V3 is once again compared to determine if it is equal to zero. When V3 is equal to zero the process returns the values U3 and U2. The value U3 is the greatest common divisor of U and V while the value U2 is the inverse of V modulo U (i.e. $V^{-1}$ MOD U), when U is a prime.

Because the Euclidean algorithm calculates the greatest integer less than or equal to U3/V3, it is not efficient for very large numbers that are processed using multiprecision arithmetic. Other GCD algorithms exist which are much more efficient for large numbers. One such algorithm is Jebelean's algorithm which is described in an article entitled "A Generalization of the Binary GCD Algorithm," *ACM Symposium on Symbolic and Algebraic Computation* (ISSAC) July, 1993, pp 111–116. This algorithm gains efficiency by calculating factors XF and YF that zero the N low-order bits of U3 and V3 when U3 and V3 are multiplied by these factors. The bit-reduced value for U3 is then calculated as (XF·U3+ YF·V3)/$2^N$, where division by $2^N$ is implemented as a right-shift by N bits. When U3 and V3 are multiplied by XF and YF, respectively, the number of bits in the new value of U3 increases but by less than N bits. Thus, the bit shift produces a net reduction in the number of bits. One problem with algorithms of this type is that they calculate GCD (F·U3, V3), where F represents the extra factors, instead of GCD (U3, V3). Consequently, when V3 equals zero, the returned value of the GCD may be greater than 1 even though U and V are relatively prime. One solution to this problem is to call a separate GCD routine, such as the Euclidean GCD routine or the Lehmer-Euclid routine, to remove these extra factors, as the GCD(U, V)=GCD(U, GCD(V, GCD')), where GCD' is the GCD having the spurious factors. While this may seem to be an expensive step, the inventors have determined that these spurious factors are almost always less than eight-bits in size when the actual GCD is one. Consequently, even invoking the GCD routine recursively is relatively inexpensive.

A second problem with algorithms of this type concerns the calculation of the inverse. The Jebelean algorithm uses a multi-precision addition/subtraction and shift operation to maintain the value of V2 for each iteration in which V2 is odd. This greatly adds to the execution time of the algorithm. This problem requires a relatively expensive fix: to maintain equation (3) one would initially calculate $T_1U+T_2V=T_3/K^X$, (in the Jebelean algorithm, K is $2^{2M}$) where it is relatively expensive to correct $T_2$ when accounting for the $K^X$ term. To maintain equation (2) one must transform $U'_1U+U'_2V=GCD'$ into $U_1U+U_2V=GCD$ where GCD | GCD'but A=(GCD'/ GCD) need not divide $U'_1$ or $U'_2$. Thus, the calculation of the inverse is not a straightforward process using the Jebelean GCD algorithm.

Modular division may be used in other types of encryption algorithms than the elliptic curve algorithm. As described above, an exemplary, simplified encryption algorithm encrypts a message M by raising a large number, representing the message M, to a power E, and determines the result modulo P. In this example the values M, E and P are each hundreds of bits in length. It is noted that this is a very unsecure, poor encryption scheme, here it is used only for illustration. There are, however, many real encryption methods, which are more complex, that use exponentiation. Operations on numbers of this size are difficult because common computer processing hardware supports at most sixty-four bit mathematical operations. Values greater than 64 bits in length are typically calculated using multiprecision arithmetic in which the numbers are broken down into, for example, 64-bit sections and the sections are processed separately. A number a raised to an exponent e can always be calculated by multiplying that number by itself the number of time represented by the exponent, or in mathematical terms:

$$a^e = a \cdot a \cdot a \ldots e \text{ number of times.}$$

Another method, which is significantly faster, is the multiply chain algorithm. In this case, let $e = e_{n-2}e_{n-2} \ldots e_1e_0$ be an n-bit exponent $e_i \in \{0,1\}$, $0 \leq i \leq n-1$ and $e_{n-1}=1$. The algorithm starts with $p_1 = a$, then $$p_{i+1} = p_i^2 \text{ if } e_{n-1-i}=0 \text{ or } a \cdot p_i^2 \text{ if } e_{n-1-i}=1, \text{ where } 1 \leq i \leq n-2.$$

Several methods are known in the art to reduce the number of multiplications used to produce efficient exponentiation of the base value.

One method known to reduce the number of multiplication is the signed digit algorithm. Using this method, the exponent is represented as a string of bits comprising the values 0 and 1. Within the bit string, sequences (or "runs") of 1's are replaced by 0's, with a 1 being placed in the next higher bit position to the most significant bit (MSB) position of the run, and "−1" being inserted in the least significant bit (LSB) position of the run. The "−1" means multiplication by $a^{-1}$. Consequently, for this method to work well, it is desirable to be able to compute $a^{-1}$ efficiently. By thus efficiently recoding the exponent bit string, the expected number of multiplication operations is reduced from n/2 to n/3.

Although the signed digit algorithm reduces the number of multiplication operations needed to calculated the exponential value $M^E$ modulo P, it replaces some of the $a \cdot p_i$ multiplication operations by $a^{-1} \cdot p_i^2$ operations (i.e. $p_i^2/a$). As described above, division may be implemented as the multiplication by the arithmetic inverse and the arithmetic inverse may be calculated using an extended GCD algorithm.

Figure 2:
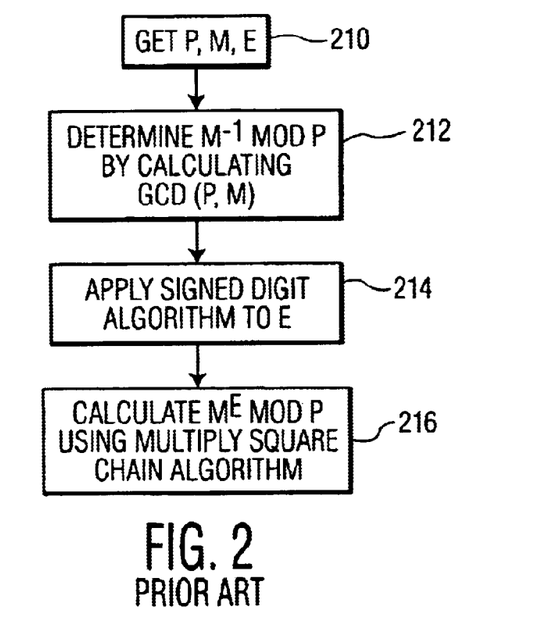
FIG. 2 (Prior Art) is a flow chart diagram, which is useful for describing a method for calculating a value $M^e$ modulo P.

FIG. 2 is a flow chart diagram, which illustrates an exemplary method for calculating $M^E$ modulo P. The first step in this algorithm, step 210 gets the values P, M and E. P is a large prime number, M is the message to be encoded and E is an exponent value to be used to encode the message. The next step in the process is to determine the inverse of M modulo P (i.e. $M^{-1}$ MOD P). This is accomplished by calculating the greatest common divisor of P and M at step 212. As P is a prime number by definition, the value U2 returned by the GCD algorithm is equal to $M^{-1}$ MOD P. Next, at step 214, the signed digit algorithm is applied to the exponent E. Finally, at step 216, the multiply-square algorithm is applied to calculate $M^E$ modulo P. As described above, the multiply-square algorithm both multiplies and divides by M. The value $M^{-1}$ MOD P is used to convert the division operation into a multiplication operation.

The Euclidean algorithm is not efficient for large numbers that require multiprecision arithmetic. The Jebelean algorithm, while efficient in calculating the greatest common divisors, is not efficient for calculating arithmetic inverses. Thus, there is a need for an efficient GCD algorithm that calculates inverses, and operates efficiently on numbers that require multiprecision arithmetic.

SUMMARY OF THE INVENTION

The present invention is embodied in a method for calculating greatest common divisors and arithmetic inverses using the Jebelean algorithm. The algorithm keeps track of the number of times that U3 and V3 have been divided by two in the process of calculating the greatest common divisor and correct the arithmetic inverse for these divisions in a single step, after the greatest common divisor has been calculated.

According to one aspect of the invention, the method modifies the equations to be $U1 \cdot U + U2 \cdot V = 2^j \cdot U3$ and $V1 \cdot U + V2 \cdot V = 2^i \cdot V3$ where i and j are the number of times that U3 and V3 have been divided by 2, respectively. The arithmetic inverse of V, U2, is corrected according to the equation $V^{-1} = U2 \cdot (2^j)^{-1}$.

According to another aspect of the invention, shifting of the binary values representing U3 and U2 is accomplished by changing the position of respective pointers to bit positions in the binary values.

According to yet another aspect of the invention, spurious factors are removed using a pre-calculated table of arithmetic inverse values. A value corresponding to a factor is selected and multiplied by the GCD value containing the spurious factor to remove the factor.

DETAILED DESCRIPTION

Figure 3:
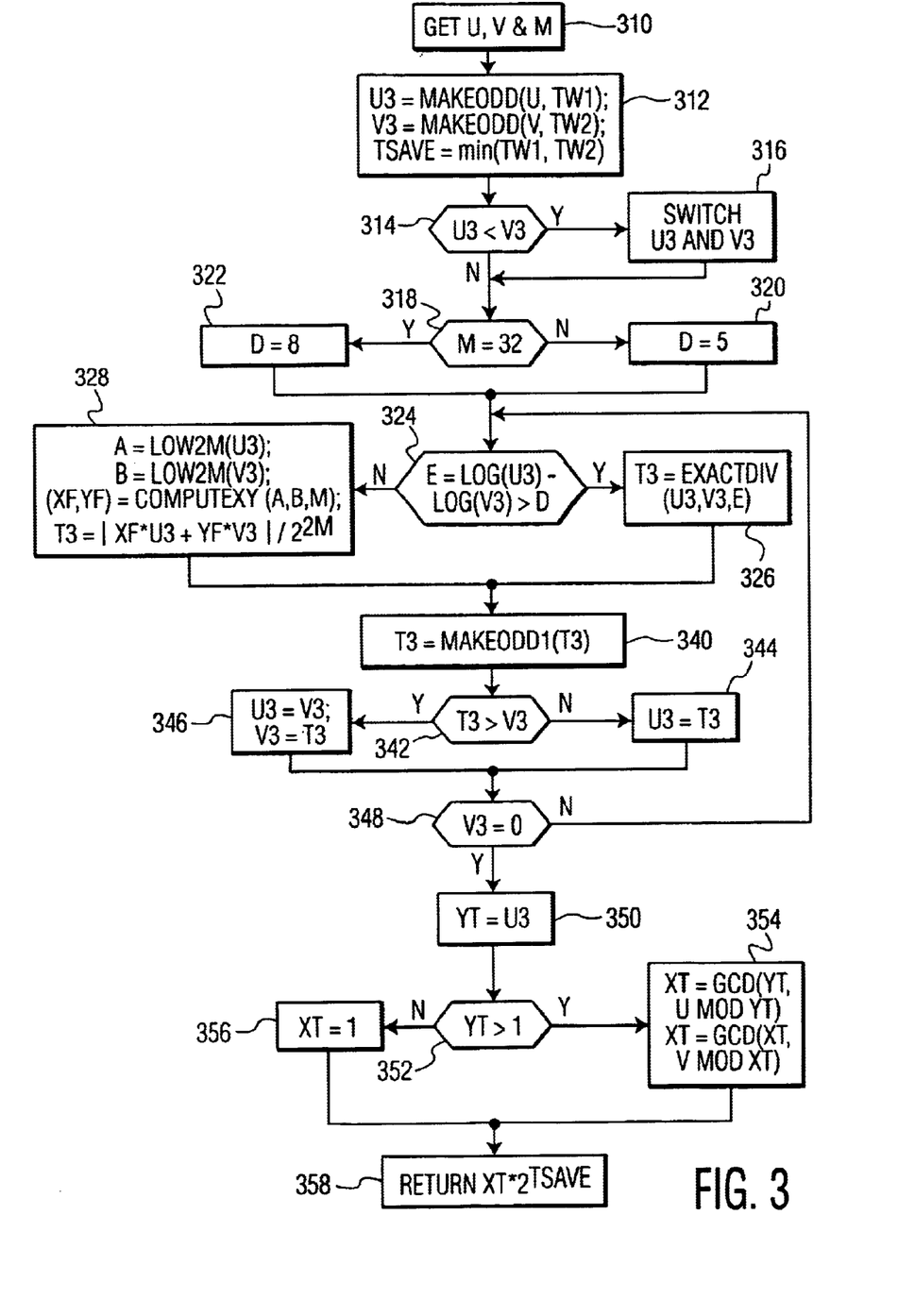
FIG. 3 is a flow chart diagram, which illustrates an exemplary Jebelean GCD algorithm.

FIG. 3 is a flow-chart diagram and an exemplary implementation of the Jebelean algorithm for calculating the greatest common divisor. The algorithm begins at step 310 which obtains the values U and V for which the greatest common divisor (GCD) is to be calculated and the value M, indicating whether the processor on which the algorithm is running uses 32 bit or 64 bit arithmetic. If the processor uses 32 bit arithmetic, M equals 16 otherwise it has a value of 32.

Figure 4:
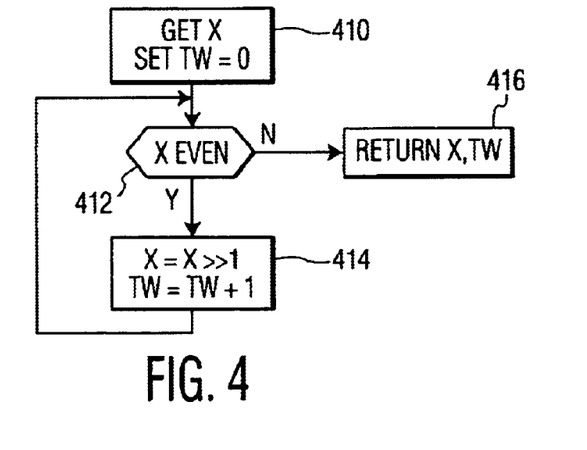
FIG. 4 is a flow-chart diagram of the routine MAKEODD that is invoked by the GCD algorithm shown in FIG. 3.

After step 310 the process executes step 312 which calls a routine MAKEODD for U and V, assigning the results to temporary variables U3 and V3, respectively. The MAKEODD routine is shown in FIG. 4. This routine begins at step 410 which obtains the input value X and sets a temporary variable TW to zero. Next, at step 412, the routine determines if X is even. If it is, step 414 is executed, which shifts the value of X to less significant positions by 1 bit and increments the value TW by one. After step 414, step 412 is executed again. When, at step 412, the value X is odd, step 416 is executed which returns the values X and TW.

Returning to FIG. 3, at step 312 the value of U provided by the MAKEODD routine is stored into the temporary variable U3 and the value V is stored into the temporary variable V3. The number of times that U and V were divided by 2 to produce the values now stored in U3 and V3 are returned as the values TW1 and TW2, respectively. Also at step 312, the minimum of the two values TW1 and TW2 is stored in the variable TSAVE.

After step 312, step 314 is executed which determines if U3 is less than V3. If so, then at step 316, the values are switched. After step 314 or step 316, step 318 is executed which determines if M is equal to 32 or 16. If M is equal to 32, step 322 is executed which sets a temporary variable D to 8. If M is equal to 16, step 320 sets the temporary variable D to 5. Next step 324 is executed. In this step the algorithm determines the difference between the bit-position of the most significant bit (MSB) of U3 and the bit-position of the MSB of V3. This difference value is assigned to a temporary variable E and compared to the variable D in step 324. If E is greater than D step 326 is executed otherwise step 328 is executed. Steps 326 and 328 are the reduction steps of the Jebelean algorithm.

In step 328 the algorithm sets a variable A to the 2M least significant bits (LSBs) of the value in the variable U3 and sets a temporary variable B to the 2M LSBs of the value in the variable V3. Next, the algorithm calls the COMPUTE-XY process described below with reference to FIG. 5. Given the values A and B, COMPUTE-XY produces factors XF and YF such that $A \cdot XF + B \cdot YF = 0 \text{ MOD } 2^{2M}$. That is to say, the values XF and YF will zero the 2M LSBs of the expression $XF \cdot U3 + YF \cdot V3$. Finally, at step 328, the algorithm calculates a new value for T3 (i.e. the new value for U3) as $|XF \cdot U3 + YF \cdot V3|/2^{2M}$.

Figure 10:
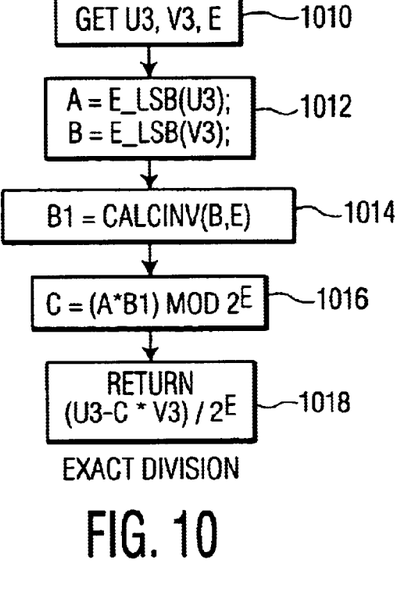
FIG. 10 is a flow-chart diagram of the process EXACT_DIVISION that is invoked by the CGD algorithm shown in FIG. 3.

If, at step 324, the value E, the difference in the positions of the MSBs of U3 and V3, is greater than the value D, step 326 is executed which calls the process EXACTDIV passing the values U3, V3 and E. This process is shown in FIG. 10. The first step in the exact division process, step 1010, gets the values U3, V3 and E. Next, at step 1012, the process assigns the E least significant bits of U3 to a temporary variable A and the E least significant bits of the value V3 to a temporary variable B. At step 1014, the process calculates a value B1, which is the arithmetic inverse of B with respect to $2^E$, by calling the process CALCINV, which is described below with reference to FIG. 6. Next, at step 1016, the process calculates a value $C = A \cdot B1$ modulo $2^E$. At step 1018, the process returns the value $(U3 - C \cdot V3)/2^E$. This value represents a new value for the variable U3.

Figure 9:
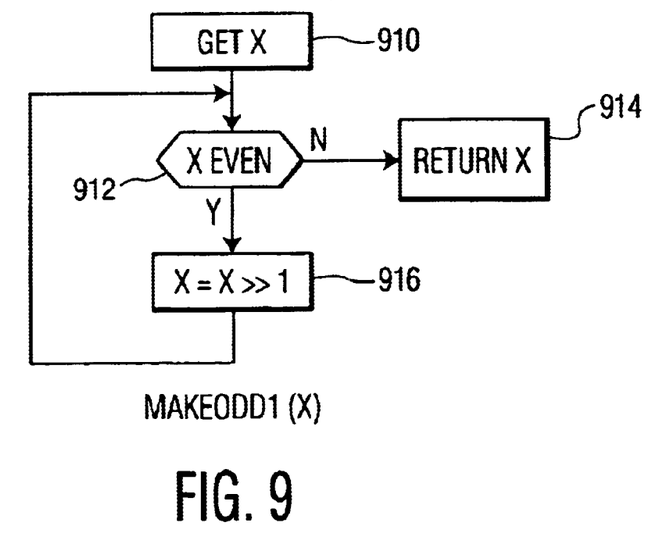
FIG. 9 is a flow-chart diagram of the routine MAKE-ODD1 that is invoked by the GCD algorithm shown in FIG. 3.

Returning to FIG. 3, the value returned by the EXACTDIV routine is stored into the variable T3 at step 326. After steps 328 or 326, the algorithm executes step 340 which calls the routine MAKEODD1 to convert T3 to an odd number by repeatedly dividing it by a factor of 2. The routine MAKEODD1 is shown in FIG. 9. The first step in this process, 910, obtains the value X. Next, at step 912 the routine tests X to determine if it is even. If X is even at step 912, then at step 916 the routine shifts X to less significant bit positions by one bit position and again executes step 912. When, at step 912, the value of X is odd, step 914 returns the value X. This routine is the same as the routine MAKEODD except that there is no attempt to keep track of the number of times that X is divided by two. Alternatively, the routine MAKEODD may be used at step 340 and the returned value TW may be ignored.

Returning to FIG. 3, after step 340, step 342 is executed, which determines if T3 is greater than V3. If T3 is not greater than V3, then at step 346, the current value in V3 is assigned to U3 and the current value in T3 is assigned to V3 in order to maintain the relationship that U3 is greater than V3. If at step 342, T3 is greater than V3, then at step 344 the value in T3 is assigned to U3. After step 346 or step 344, the algorithm tests V3 to determine if it is equal to zero. If V3 is not equal to zero, control transfers to step 324 to perform another reduction step. If, however, at step 348 V3 is equal to zero, then the current value in U3 is the GCD of U and V. In this instance step 350 is executed which assigns the value in U3 to the temporary variable YT. Next, step 352 determines if YT is greater than 1. If YT is greater than one then the GCD value may be greater than one but may also contain one or more spurious factors. If YT is greater than one, step 354 is executed in which another greatest common divisor routine is invoked to calculate the greatest common divisor of YT and (U MOD YT). This value is stored into the variable XT. Next, at step 354, a GCD routine is called to calculate the GCD of XT and (V MOD XT). This value is also stored into the temporary variable XT. After step 354, the variable XT holds the greatest common divisor of U and V with any spurious factors removed.

If, at step 352, YT is not greater than one then, at step 356 sets the variable XT to unity. After step 354 or 356 the algorithm returns the value $XT \cdot 2^{TSAVED}$ as the greatest common divisor of U and V. As described above, the value TSAVE is the number of times that both U and V were divided by 2 in order to produce the temporary values U3 and V3. This value represents a common factor of U and V and is, therefore, a common factor of the greatest common divisor of U and V.

While calling GCD algorithms twice in step 354 may seem an expensive step in order to remove the spurious factors from the calculated GCD value, the inventors have determined that the spurious factors are typically less than 8 bits and, thus, the invocation of the GCD algorithm is a relatively inexpensive operation. Because such small numbers are being processed, the GCD routine used in step 354 may be, for example, the Euclid routine described above with reference to FIG. 1.

Figure 5:
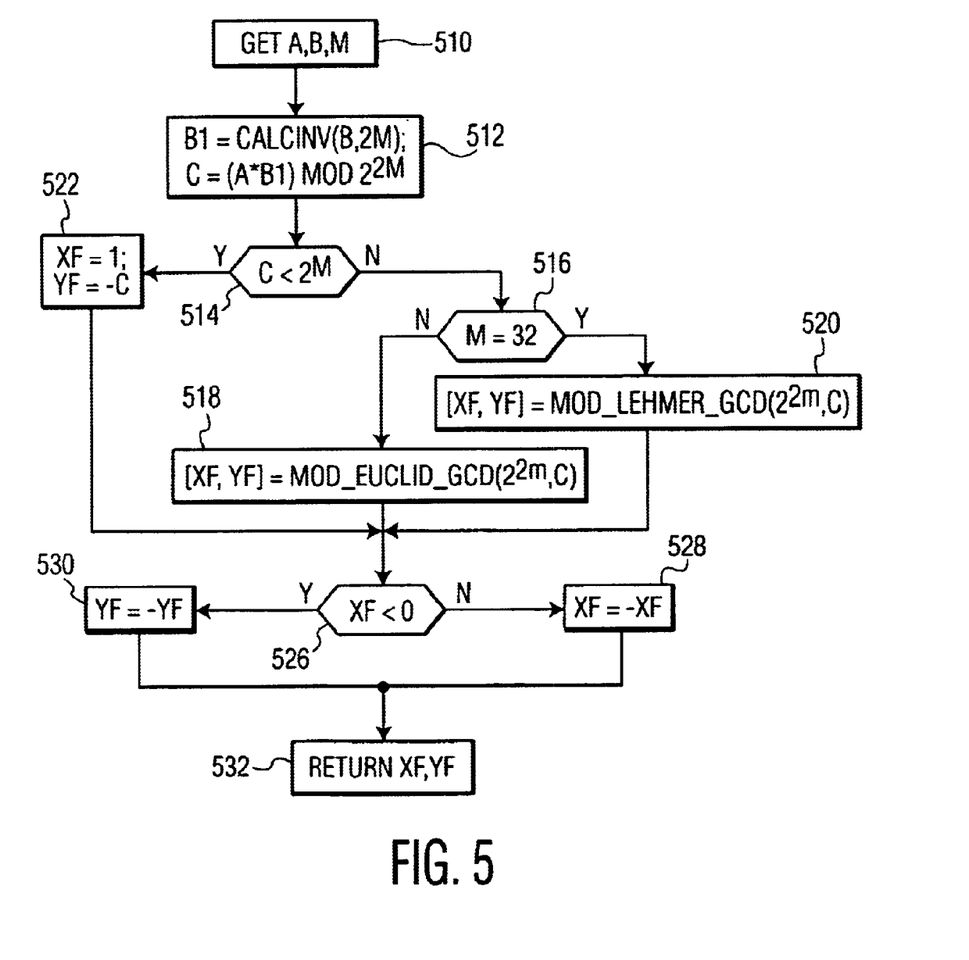
FIG. 5 is a flow-chart diagram of the process COMPUTE-XY that is invoked in the GCD algorithm shown in FIG. 3.

Referring to FIG. 5, the routine COMPUTE-XY begins at step 510 by obtaining the values A, B and M. This routine determines values for variables XF and YF such that $XF \cdot A + YF \cdot B < 2^M$. The next step in the process, step 512, calculates the inverse of B with respect to $2^{2M}$ and assigns this value to a temporary variable B1. The calculation of this inverse invokes the routine CALCINV, described below with reference to FIG. 6. Also at step 512, the process calculates $(A \cdot B1)MOD2^{2M}$ and assigns the result to a temporary variable C. This calculation divides A by B modulo $2^{2M}$, using the calculated inverse value B1. At step 514, the process tests the value C to determine if it is less than $2^M$. If it is, then, at step 522, XF is set to 1 and YF is set to -C. If C is not less than $2^M$, then, at step 516, the process determines whether M is 16 or 32. If M is 32, then the process invokes a modified Lehmer GCD routine (MOD_LEHMER_GCD, described below with reference to FIG. 7) at step 520 to calculate the GCD of $2^M$ and C. If M is 16 at step 516, then the process invokes a modified Euclidean GCD routine (MOD_EUCLID_GCD, described below with reference to FIG. 8). These routines do not, however, calculate the full GCD. Instead, they stop when U3 is less than $2^M$. It is noted that equation (7) requires that if, U3 is less than $2^M$, U1 and U2 are also less than $2^M$. Each of these routines returns the partially computed GCD value into the variable XF and the partially computed arithmetic inverse of C modulo $2^{2M}$ into the variable YF.

Step 526 is executed after step 518, 520 or 522. This step determines if XF is less than zero. If it is, step 528 is executed which changes the sign of the variable XF. Otherwise the sign of the variable YF is changed at step 530. After step 528 or step 530, step 532 is executed which returns the values XF and YF to the Jebelean GCD algorithm at step 328 (shown in FIG. 3).

Figure 6:
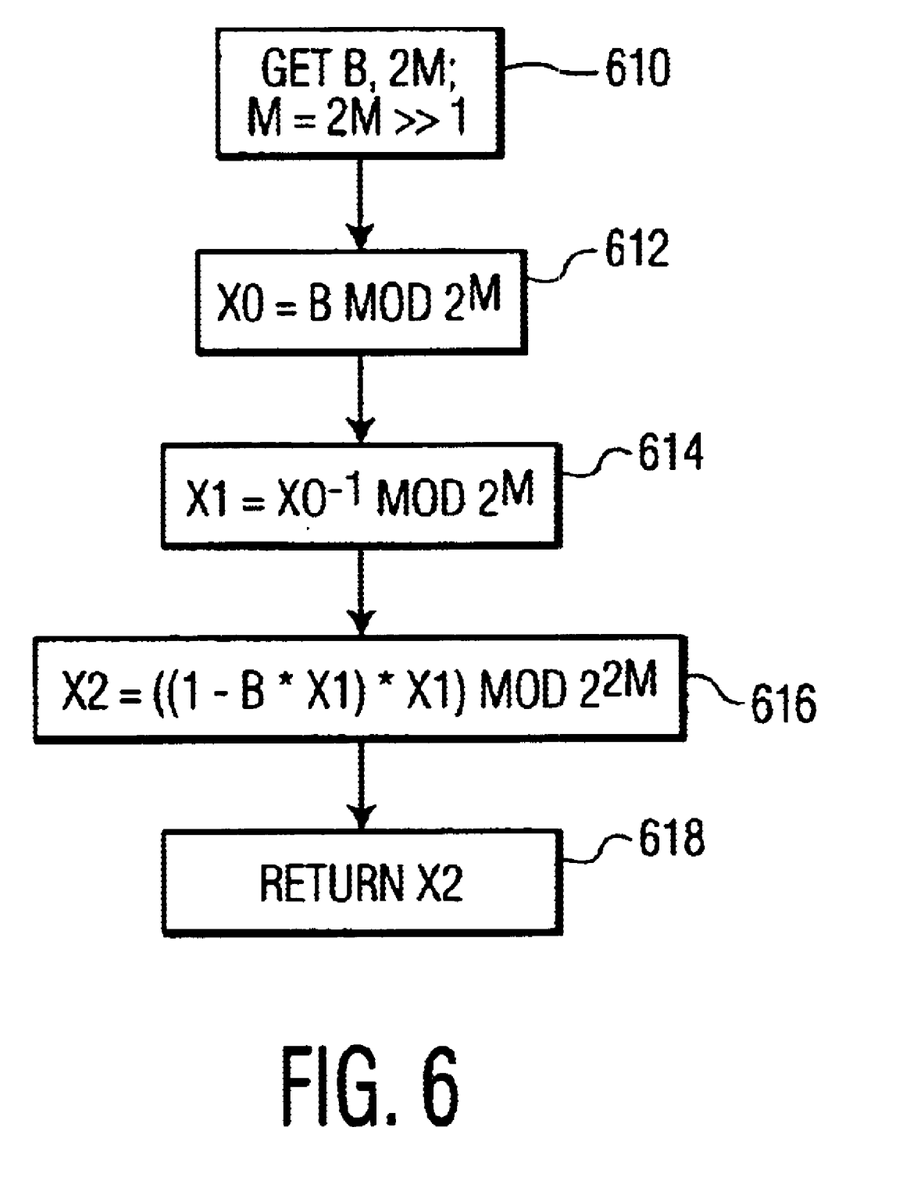
FIG. 6 is a flow-chart diagram of the process CALCINV that is invoked by the COMPUTE-XY process shown in FIG. 5.

FIG. 6 is a flow-chart diagram of the CALCINV routine that is invoked at step 512 of the COMPUTE-XY routine. The CALCINV routine begins at step 610 which gets the values for B and 2M, shifts the value 2M to less significant bit positions by one bit, to divide it by two, and assigns the shifted value to the temporary variable M. Next, at step 612, the routine calculates a value B modulo $2^M$ and assigns this value to the temporary variable X0. At step 614, the routine calculates the inverse of X0 with respect to $2^M$ and assigns the result to a temporary variable X1. This may be done, for example, using a GCD routine such as the Euclid routine shown in FIG. 2 or a look-up table as $2^M$ is known and B is less than $2^{2M}$ because CALCINV is invoked from COMPUTE-XY which is invoked from step 328 of FIG. 3. Next, at step 616, the routine calculates the inverse value, X2, which is equal to $B^{-1}$ modulo $2^{2M}$ according to equation (10).

$$X2 = B^{-1} MOD 2^{2M} = ((1 - B \cdot X1) \cdot X1) MOD 2^{2M} \tag{10}$$

At step 618, the routine returns the value X2 as the inverse of the input variable B modulo $2^{2M}$.

Equation 10 may be simplified by pre-computing values of the inverse of B with respect to $2^{2M}$ for each M between, for example, 2 and 16, and storing the results in 15 look-up tables. If M is larger than 16, the routine may still be used by successively halving M until one of the 15 tables may be applied to calculate the inverse and then invoking CALCINV recursively to compute the inverse. Furthermore, that equation (10) may be rearranged to form equations (11) and (12) to produce an inverse value that is always positive. This is desirable because it allows full use of all 32 or 64 bits of the variables used in the routine.

$$TEMP = ((B \cdot X1 - 1)X1) MOD 2^{2M} \tag{11}$$

$$X2 = B^{-1} MOD 2^{2M} = 2^{2M} - TEMP \tag{12}$$

Figure 7:
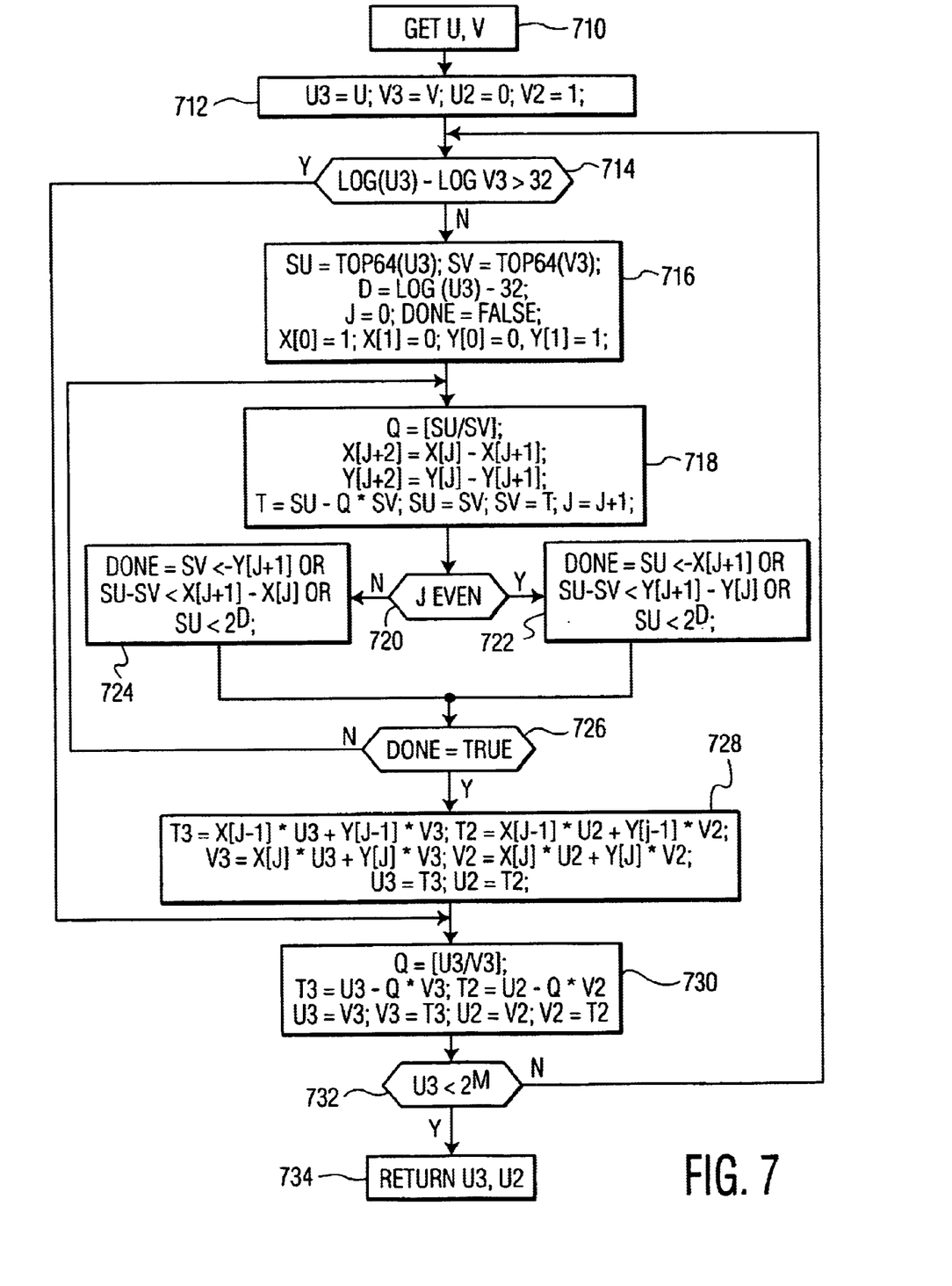
FIG. 7 is a flow-chart diagram of a modified Lehmer GCD algorithm, which is used by the COMPUTE-XY process shown in FIG. 5.

As described above, in the COMPUTE-XY routine shown in FIG. 5, when M equals 32, the CALCULATE GCD step 516 invokes a modified version of the Lehmer-Euclid GCD algorithm. The Basic Lehmer-Euclid algorithm is described in an article by J. Sorenson entitled "An Analysis of Lehmer's Euclidean GCD Algorithm," ACM International Symposium on Symbolic and Algebraic Computation (ISSAC), July 1995, pp 254–258. The algorithm described in the article calculates the GCD of U and V. It is modified for the subject invention to terminate when U3 is less than $2^M$. FIG. 7 is a flow-chart diagram of this modified GCD algorithm.

At step 710 of FIG. 7, the process obtains U and V. Because the process shown in FIG. 7 is invoked from the COMPUTE-XY routine (shown in FIG. 5), which is itself invoked from the inventive GCD algorithm (shown in FIG. 3), the values U and V are the bottom 2M bit of the values being processed by the algorithm shown in FIG. 3. When the process shown in FIG. 7 is invoked, M equals 32 and so, 2M equals 64.

The next step in the process, step 712, assigns the values U and V to temporary variables U3 and V3, respectively. Also at step 712, the temporary variables U2 and V2 are initialized to 0 and 1, respectively. At step 714, the routine determines if the bit-position of the most significant bit in the value U3 differs from the bit-position of the most significant bit in the value V3 by more than 32. If this condition is true, control transfers to step 730, described below. Otherwise, control transfers to step 716. At step 716, the process initializes the inter-reduction step used by the Lehmer algorithm. This step sets temporary variables SU and SV to the current values of U3 and V3, respectively; sets a temporary variable D to the index of the most significant non-zero bit in U3 minus 32 (i.e. $\log_2$ (U3)−32); sets an index variable J to zero, a condition variable DONE to false; and initializes the first two entries in the arrays X and Y, setting X[0] and Y[1] to one and X[1] and Y[0] to zero.

At step 718, the process calculates a value Q as the greatest integer less than SU divided by SV. Next, step 718 assigns the value X[J]−X[J+1] to the array element X[J+2] and assigns the value Y[J]−Y[J+1] to the array element Y[J+2]. Also at step 718, the routine reduces SU by the inter-reduction number of bits and assigns the result to a temporary variable T to facilitate switching the values of SU and SV. Finally at step 718, the routine increments the index variable J by one.

At step 720, the routine determines if J is even or odd. If it is even then the routine, at step 722, calculates a value for the Boolean variable DONE as SU<−X[J+1] or SU−SV<Y[J−1]−Y[J] or SU<$2^D$. This last condition is not a part of the Lehmer Euclid algorithm but is added to terminate the inter-reduction step when the routine is used by the COMPUTE-XY routine. If J is even at step 720 then the process, at step 724, calculates a value for the Boolean variable DONE as SV <−Y[J+1] or SU−SV<X[J−1]−X[J] or SU<$2^D$. After either step 722 or 724, the process tests the Boolean variable DONE. If it is true then control transfers to step 728, described below. If it is false control transfers to step 718 to perform another inter-reduction step.

Step 728 calculates updated values for U3 and U2, according to equations (13) and (14) assigning the values to temporary variables T3 and T2.

$$T3 = X[J-1] \cdot U3 + Y[J-1] \cdot V3 \quad (13)$$

$$T2 = X[J-1] \cdot U2 + Y[J-1] \cdot V2 \quad (14)$$

The routine also calculates new values for V3 and V2 according to equations (15) and (16).

$$V3 = X[J] \cdot U3 + Y[J]V3 \quad (15)$$

$$V2 = X[J] \cdot U2 + Y[J]V2 \quad (16)$$

Finally, the values in the temporary variables T3 and T2 are assigned to U3 and U2.

After step 728 or after step 714 if the difference in the number of bits in U3 and V3 is greater than 32, step 730 is executed. This step performs the same inter-reduction step as the Euclidean algorithm, switching the values of U3 and V3 after reducing the number of bits in U3. After this step, step 732 determines if U3 is less than $2^M$. If it is, the routine is done and the values U3 and U2 are returned as the values XF and YF. If U3 is not less than $2^M$, then control transfers to step 714 to continue the inter-reduction steps until the test at step 732 is satisfied.

Figure 8:
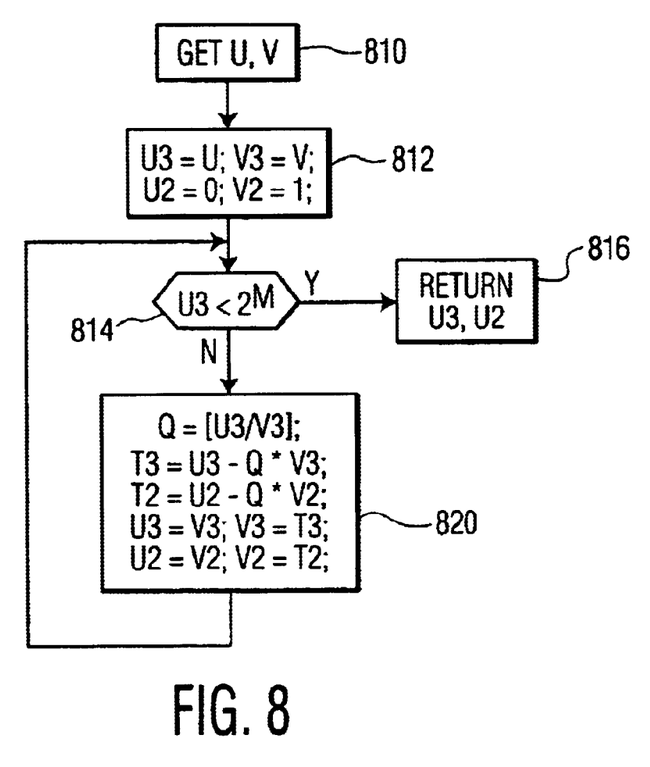
FIG. 8 is a flow-chart diagram of a modified Euclidean GCD algorithm that is used by the COMPUTE-XY process shown in FIG. 5.

As set forth above, the Lehmer-Euclid algorithm is used only when M equals 32 at step 516 of the COMPUTE-XY routine described above with reference to FIG. 5. When M equals 16, the inventive GCD algorithm uses a modified version of the Euclidean GCD algorithm. This modified Euclidean algorithm is shown in FIG. 8. Steps 810, 812, 816 and 818 of this algorithm are identical to the respective steps 110, 112, 116 and 118, described above with reference to FIG. 1. The only difference is in the termination condition at step 814. In the modified Euclidean GCD algorithm, this condition terminates the algorithm when U3 is less than $2^M$ rather than when V3 equals zero as in the algorithm shown in FIG. 1.

Figure 12:
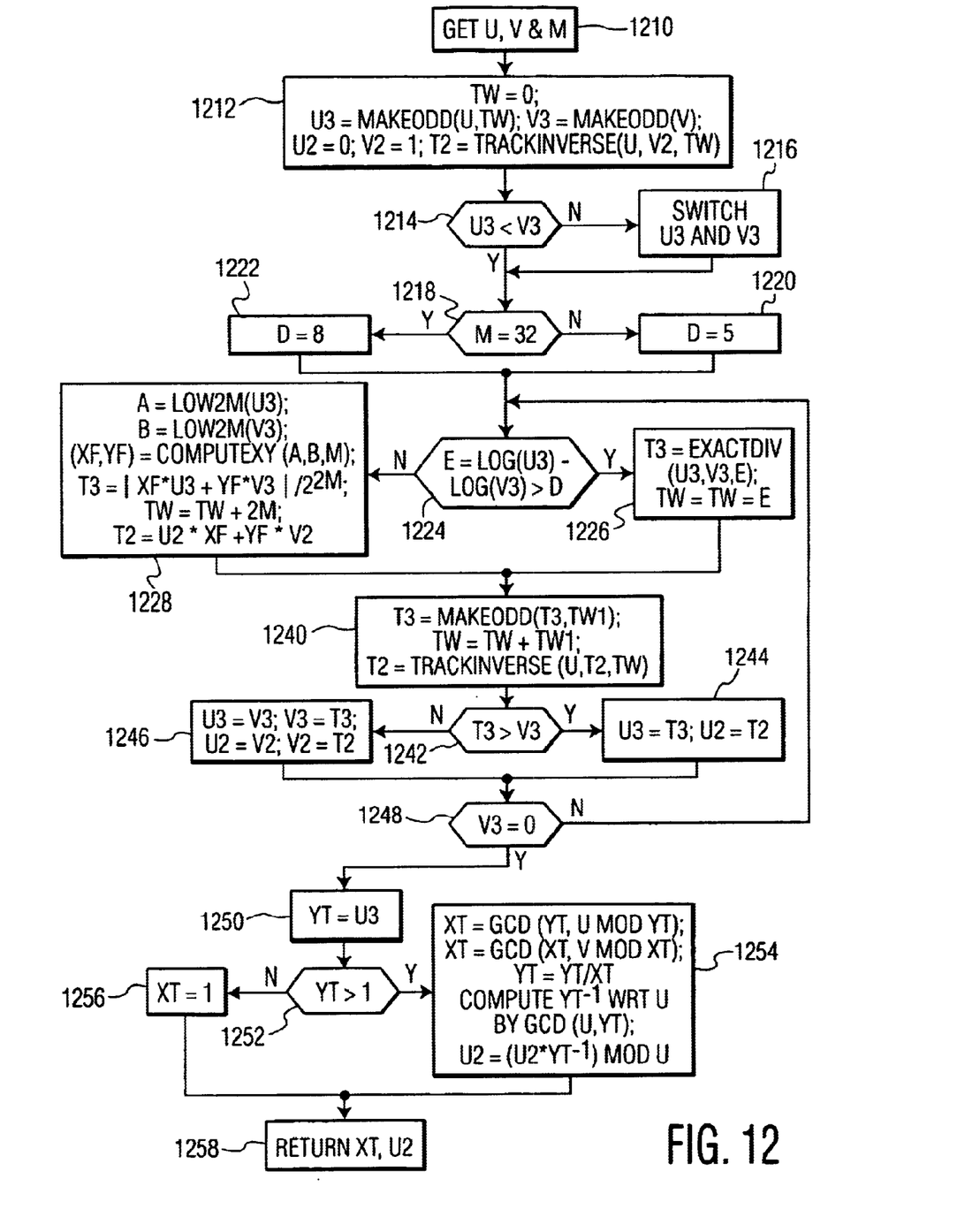
FIG. 12 is a flow chart diagram, which illustrates the GCD algorithm shown in FIG. 3 including an inverse calculation.

FIG. 12 is a flow chart diagram of the Jebelean GCD algorithm with modifications to calculate the arithmetic inverse of V with respect to U. The first step in the process, step 1210, obtains the values U, V and M. Next, at step 1212, the process sets a temporary variable TW to zero and calls MAKEODD and MAKEODD1 to reduce any even values of U and V respectively to odd values, which are stored in the variables U3 and V3. Also at step 1212, a temporary variable U2 is set to 0 and V2 is set to 1. Finally, in step 1212, the algorithm invokes the TRACKINVERSE routine passing the values U, V2 and TW. The result of the TRACKINVERSE routine is stored into the variable T2.

Figure 11:
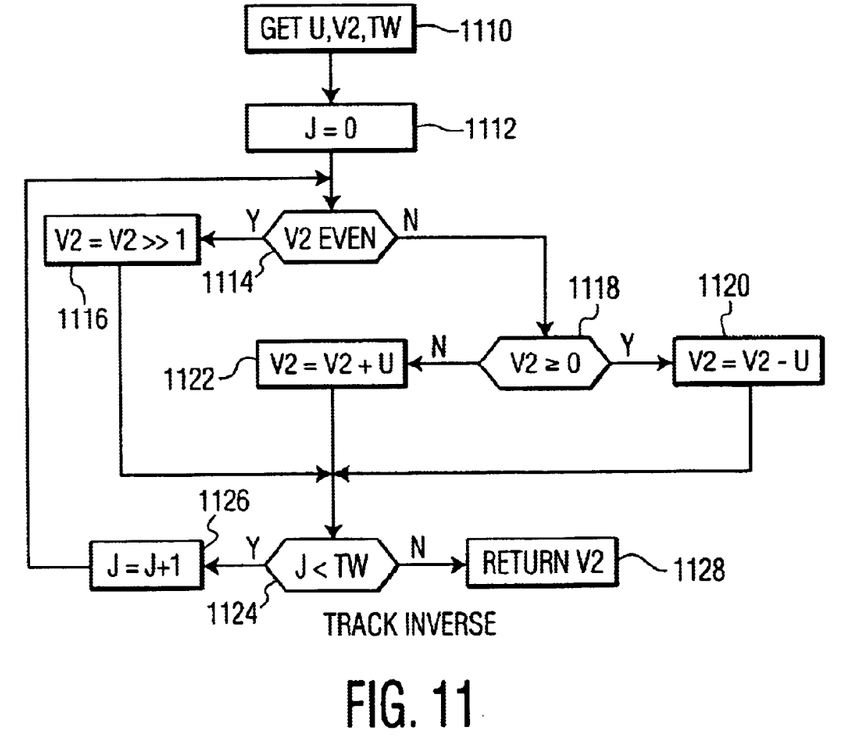
FIG. 11 is a flow-chart diagram of the process TRACK_INVERSE that is used in the GCD algorithm shown in FIG. 11.

FIG. 11 is a flow chart diagram of the track inverse routine. The routing begins at step 1110 which obtains the values U, V2 and TW. Next, at step 1112, the routine sets an index variable J equal to 0. At step 1114, the routine determines if V2 is even. If so, step 1116 is executed which shifts V2 to less significant bit positions by 1 bit. If, however, at step 1114, V2 is odd, then step 1118 is executed. At step 1118, if V2 is greater than or equal to 0 then at step 1120 V2 is set to V2−U. If, however, V2 is less than 0 then, at step 1122 V2 is set to V2+U. After step 1116, 1120 or 1122, step 1124 is executed to determine if J is less than TW. If J is less than TW then step 1126 is executed which increments J by 1 and returns control to step 1114, described above. When, at step 1124, J is equal to TW the routine returns the value V2, at step 1128.

Returning to FIG. 12, after step 1212, step 1214 is executed which determines, after the shifting operations of the MAKEODD routines, if U3 is less than V3. If U3 is less than V3 then, at step 1216, the values in U3 and V3 are switched. Next, at step 1218, the algorithm determines if M is equal to 32. If M is equal to 32 then, at step 1222, the algorithm assigns a value of 8 to the temporary variable D otherwise the temporary variable D is set to 5 at step 1220. Next, at step 1224, the algorithm determines the difference between the bit-positions of the most significant bits of U3 and V3 and assigns this value to the temporary variable E. Step 1224 also compares this difference value to the temporary variable D. If E is less than D, then step 1228 is executed which performs the same function as step 328 described above with reference to FIG. 3, in reducing the number of bits in U3 by 2M. After reducing the number of bits in U3, and assigning the result to the temporary variable T3, step 1228 sets TW=TW+2M and sets T2 equal to U2·XF+YF·V2.

If, at step 1224, E is greater than D, then step 1226 is executed which invokes the EXACTDIV routine, described above with reference to FIG. 10, to reduce the number of bits in U3 by E bits. Step 1226 also sets TW=TW+E.

After step 1226 or 1228, step 1240 is executed which calls the routine MAKEODD to successfully divide the value in T3 by 2 until T3 is odd. The number of times that T3 is divided by 2 is returned as the variable TW1. Next, at step 1240, the algorithm adds the values TW and TW1 and stores the result in TW. Finally, at step 1240, the algorithm calls the TRACKINVERSE routine to update the inverse value T2 to account for the number of times, TW, that U3 has been divided by 2. After step 1240, step 1242 is executed which determines if T3 is greater than V3. If T3 is greater than V3, then at step 1246, U3 is set V3, V3 is set to T3, U2 is set to V2 and V2 is set to T2. Otherwise, step 1244 is executed in which U3 is set to T3 and U2 is set to T2. After step 1244 or 1246, step 1248 is executed which determines if V3 is equal to zero. If V3 is not equal to zero, then control transfers to step 1224 to perform another reduction step.

When, at step 1248, V3 is equal to 0, step 1250 is executed in which YT is set to U3. At step 1252, the algorithm determines if YT is greater than 1. If it is, then the GCD value may include spurious factors and step 1254 is executed. This step calls a GCD routine to determine the greatest common divisor of YT and U MOD YT. Next, XT is calculated as the greatest common divisor of XT and (V MOD XT). YT is set equal to the YT divided by XT, and an extended GCD routine is invoked to calculate the arithmetic inverse of YT with respect to U. The value of U2 is then multiplied by arithmetic inverse of YT MODULO U and the result is stored in U2.

If, at step 1252, the value YT is equal to 1, then at step 1256 the variable XT is set to 1. After step 1254 or 1256, step 1258 is executed which returns the values XT and U2, in this instance XT is the greatest common divisor and U2 is the arithmetic inverse of V with respect to U.

As described above, the Jebelean algorithm is an efficient method of calculating the greatest common divisor of two values. The straightforward extension of the algorithm in order to compute arithmetic inverses, however, is less efficient as the Jebelean algorithm includes a number of steps where values are divided by 2. While this division operation is a relatively inexpensive shift operation, the corresponding operation to maintain the equations involves a multiprecision addition/subtraction and shift operation whenever the current value of V2 is not even. To improve the speed of the inverse calculation, the inventors have observed that it is not necessary to divide by $2^{2M}$ and $2^D$. Accordingly, the inventors have realized that the equations (7) and (8) may be a modified as set forth in equations (17) and (18).

$$U1 \cdot P + U2 \cdot X = 2^J \cdot U3 \tag{17}$$

$$V1 \cdot P + V2 \cdot X = 2^I V3 \tag{18}$$

Where I and J are the number of times that U3 and V3 have been divided by 2, respectively. Consequently, after the spurious factors are removed, the arithmetic inverse value can be obtained by multiplying U2 by the inverse of $2^J$ with respect to P. In addition, when the prime number P is known in advance, a table of inverses for $2^J$ with respect to P may be pre-calculated.

Although the invention has been described as a method, it is contemplated that it may be practiced by apparatus specially configured to perform the method or by computer program instructions embodied in a computer-readable carrier such as an integrated circuit, a memory card, a magnetic or optical disk or an audio-frequency, radio-frequency or optical carrier wave.

While the invention has been described in terms of exemplary embodiments it is contemplated that it may be practiced as described above within the scope of the attached claims.

What is claimed:

1. A computer implemented method for performing modular division operations used in a cryptographic process over a finite field $F_P$ defined for a prime number P, in which values are divided by a divisor D modulo P, the method comprising the steps of:

calculating an arithmetic inverse of D modulo P using a Jebelean algorithm including the steps of;

assigning P to a temporary variable U3, D to a temporary variable V3, 0 to a temporary variable U2 and 1 to a temporary variable V2;

reducing U3 and V3 in magnitude while maintaining equations in L13, U2, V2 and V3, wherein one step in reducing U3 and V3 in magnitude divides U3 by two;

keeping track of a number of times that U3 is divided by two in the process of calculating the greatest common divisor;

adjusting the value of U2 to compensate for the number of times that U3 is divided by two; and returning the variable U2 as the arithmetic inverse value when the GCD has been calculated; and multiplying by U2 the values that are to be divided by D to perform the division operation.

2. A computer implemented method according to claim 1, wherein the step of adjusting the value of V2 to compensate for the number of times that U3 is divided by two includes the steps of, for each time that U3 has been divided by two:

determining if V2 is even or odd;

if V2 is even, shifting V2 to less significant bit positions by one bit position; and if V3 is odd, adding P to V2 if V2 is less than zero and subtracting P from V2 if V2 is greater than zero.

3. A computer implemented method according to claim 1, wherein the step of adjusting the value of V2 to compensate for the number of times that U3 is divided by two includes the steps of:

keeping track of the number of times V3 is divided by two;

successively reducing U3 and V3 in magnitude while maintaining equations:

$$U1 \cdot P + U2 \cdot X = 2^j \cdot U3 \text{ and}$$

$$V1 \cdot P + V2 \cdot X = 2^i V3$$

where i and j are the number of times that U3 and V3 have been divided by 2, respectively and U1=(U3−U2·V)/U and V1=(V3−V2·U)/V; and adjusting the value of $V^{-1}$, the arithmetic inverse of V, as stored in the variable U2, according to the equation $V^{-1} = U2 \cdot (2^j)^{-1}$.

4. A computer method according to claim 1, wherein the step of dividing U3 and V3 by 2 includes the step of changing position of respective pointers to bit positions in binary values representing U3 and V3.

5. A computer implemented method according to claim 1, wherein the encryption process is a multiplication operation in an elliptic curve group using a generator point as a key for encrypting data.

6. A computer implemented method according to claim 1, wherein, in the Jebelean GCD algorithm, the step of reducing U3 and V3 in magnitude while maintaining equations in U3, U2, V2 and V3, includes the step of determining values XF and YF such that XF·U3+YF·43 is a value having zero in its M least significant bit positions, where M is an integer; and the step of determining values XF and YF includes the steps of:

setting a temporary variable A equal to the 2M least significant bits of U3; setting a temporary variable B equal to the 2M least significant bits of V3; calculating a value B1 equal to the arithmetic inverse of B with respect to $2^{2M}$ according to the equation:

$$B1=B^{-1} MOD2^{2M}=2^{2M}-((B \cdot X1-1) \cdot X1) MOD2^{2M}$$

where X1 is the arithmetic inverse of the remainder of B modulo $2^M$;

setting a temporary variable C equal to $(A \cdot B1) MOD2^{2M}$;

if C is less than $2^M$, setting XF equal to 1 and YF equal to $-C$; and if C is not less than $2^M$, determining XF and YF using a greatest common divisor operation.

7. A computer implemented method according to claim 1, further including the steps of:

calculating a table T of arithmetic inverses of values between 2 and 255 module P;

After the step of reducing U3 and V3 in magnitude while maintaining equations in U3, U2, V2 and V3, if U3 is greater than unity, multiplying U2 by T to remove spurious factors from U2 before returning U2 as the arithmetic inverse value.

8. A computer readable carrier including computer program instructions, the computer program instructions causing a computer to implement a method for performing modular division operations used in a cryptographic process over a finite field $F_P$ defined for a prime number P, in which values are divided by a divisor D modulo P, the method comprising the steps of:

calculating an arithmetic inverse of D and P using a Jebelean algorithm including the steps of:

assigning P to a temporary variable U3, D to a temporary variable V3, 0 to a temporary variable U2 and 1 to a temporary variable V2;

reducing U3 and V2 in magnitude while maintaining equations in U3, U2, V2 and V3, wherein one step in reducing U3 and V3 in magnitude divides U3 by two;

keeping track of a number of times that U3 is divided by two in the process of calculating the greatest common divisor; adjusting the value of U2 to compensate for the number of times that U3 is divided by two; and returning the variable U2 as the arithmetic inverse value when the GCD has been calculated; and multiplying by U2 the values that are to be divided by D to perform the division operation.

9. A computer-readable carrier according to claim 8, wherein the computer program instructions, in causing the computer to perform the step of adjusting the value of V2 to compensate for the number of times that U3 is divided by two causes the computer to perform the steps of, for each time that U3 has been divided by two:

determining if V2 is even or odd;

if V2 is even, shifting V2 to less significant bit positions by one bit position; and if V3 is odd, adding P to V2 if V2 is less than zero and subtracting P from V2 if V2 is greater than zero.

10. A computer readable carrier according to claim 8, wherein the computer program instructions, in causing the computer to perform the step of adjusting the value of V2 to compensate for the number of times that U3 is divided by two causes the computer to perform the steps of:

keeping track of the number of times V3 is divided by two; successively reducing U3 and V3 in magnitude while maintaining equations:

$U1 \cdot P + U2 \cdot X = 2^j U3$ and $V1 \cdot P + V2 \cdot X = 2^i \cdot V3$ where i and j are the number of times that U3 and V3 have been divided by 2, respectively and $U1=(U3-U2 \cdot V)/U$ and $V1=(V3-V2 \cdot U)/V$; and adjusting the value of $V^{-1}$, the arithmetic inverse of V, as stored in the variable U2, according to the equation $V^{-1}=U2 \cdot (2^j)^{-1}$.

11. A computer-readable carrier according to claim 8, wherein computer program instructions, in causing the computer to perform the step of dividing U3 and V3 by 2 cause the computer to change respective pointer positions to bit positions in binary values representing U3 and V3.

12. A computer-readable carrier according to claim 8, wherein the encryption process is an addition operation in an elliptic curve group to generate a key for encrypting data.

13. A compute-readable carrier according to claim 8, wherein, the computer program instructions that cause the computer to calculate the arithmetic inverse of D and P using the Jebelean GCD algorithm, cause the computer to perform the step of reducing U3 and V3 in magnitude while maintaining equations in U3, U2, V2 and V3, including the step of determining values XF and YF such that XF·U3+YF·V3 is a value having zero in its M least significant bit positions, where M is an integer; and the step of determining values XF and YF includes the steps of:

setting a temporary variable A equal to the 2M least significant bits of U3;

setting a temporary variable B equal to the 2M least significant bits of V3;

calculating a value Bi equal to the arithmetic inverse of B with respect to $2^{2M}$ according to the equation:

$$B1=B^{-1} MOD2^{2M}=2^{2M}-((B \cdot X1-1) \cdot X1) MOD2^{2M};$$

where X1 is the arithmetic inverse of the remainder of B modulo $2^M$;

setting a temporary variable C equal to $(A \cdot B1) MOD2^{2M}$;

if C is less than $2^M$, setting XF equal to 1 and YF equal to $-C$; and if C is not less than $2^M$, determining XF and YF using a greatest common divisor operation.

14. A computer readable medium according to claim 8, further including computer program instructions that cause the computer to perform the steps of:

calculating a table T of arithmetic inverses of values between 2 and 255 modulo P;

After the step of reducing U3 and V3 in magnitude while maintaining equations in U3, U2 V2 and V3, if U3 is greater than unity, multiplying U2 by T to remove spurious factors from U2 before returning U2 as the arithmetic inverse value.

15. Cryptographic apparatus which performs division operations over a finite field $F_P$ defined for a prime number P, in which values are divided by a divisor D modulo P, comprising:

means for calculating an arithmetic inverse of D and P using a Jebelean algorithm including:

means for assigning P to a temporary variable U3, D to a temporary variable V3, 0 to a temporary variable U2 and 1 to a temporary variable V2;

means for reducing U3 and V3 in magnitude while maintaining equations in U3, U2, V2 and V3, including means for dividing U3 by two;

means for keeping track of a number of times that U3 is divided by two in the process of calculating the greatest common divisor;

means for adjusting the value of U2 to compensate for the number of times that U3 is divided by two; and means for returning the variable U2 as the arithmetic inverse value when the GCD has been calculated; and a multiplier for multiplying by U2 the values that are to be divided by D to perform the division operation.

* * * * *